(No Model.)

J. F. WHEELER.
TOOTH HOLDER FOR CULTIVATORS.

No. 301,545. Patented July 8, 1884.

Witnesses:
C. B. Story.
W. Sinnott.

Inventor:
Joseph F. Wheeler
By,
Jas. B. Erwin
Attorney.

UNITED STATES PATENT OFFICE.

JOSEPH F. WHEELER, OF WYOCENA, WISCONSIN.

TOOTH-HOLDER FOR CULTIVATORS.

SPECIFICATION forming part of Letters Patent No. 301,545, dated July 8, 1884.

Application filed April 17, 1883. (No model.)

*To all whom it may concern:*

Be it known that I, JOSEPH F. WHEELER, a citizen of the United States, residing at Wyocena, in the county of Columbia and State of Wisconsin, have invented certain new and useful Improvements in Teeth-Holders for Cultivators, Seeders, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in devices for attaching the teeth of cultivators, seeders, &c., to their draw-bars.

The object of my improvements is to provide a device for rigidly retaining the teeth in their proper position at the required angle when unobstructed and performing ordinary work, but which is adapted to release said teeth when obstructed or brought in contact with stationary objects, whereby the teeth may be inclined backward and permitted to pass freely over such obstructions without liability of being broken.

Figure 1:
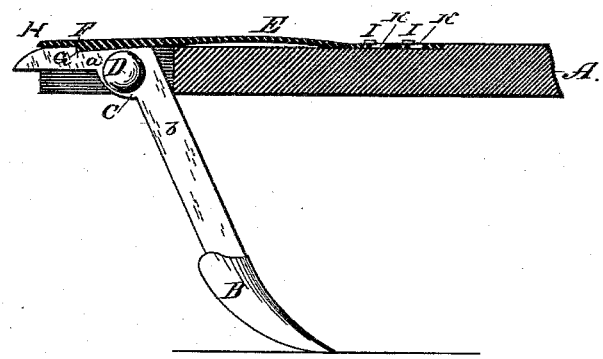
Figure 2:
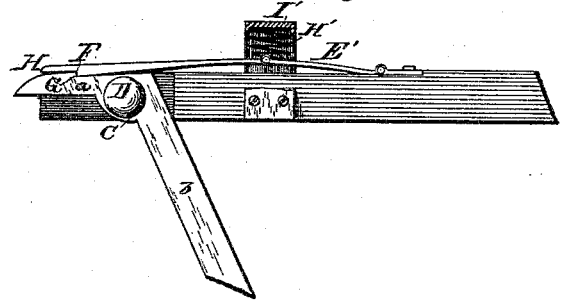

My invention is further explained by reference to the accompanying drawings, in which Figures 1 and 2 are side elevations.

Like parts are represented by the same reference-letters.

A represents the draw-bar of a cultivator, seeder, or other seeding agricultural implement.

B is the cultivator or seeder tooth, both of which parts are of the ordinary construction.

C is the improved shank or tooth holder.

D is a pivotal bolt, by which the shank is attached to the side of the draw-bar. The shank C resembles in shape a bell-crank lever, the two arms, $a$ $b$, of which are formed at nearly right angles to each other, the arm $b$ being inclined forward slightly, as shown, while the arm $a$ is in line with the draw-bar.

E is a plate-spring, which is bolted at its front end to the upper surface of the draw-bar A, and its rear end is provided with a shoulder, F, which engages in a corresponding recess, G, in the upper surface of arm $a$, whereby the shank and tooth are rigidly retained in their proper position for ordinary work. When, however, the tooth B is brought in contact with a stationary or immovable object, or is too severely resisted, the spring-bar E is bowed upward at its center, whereby the rear end, H, of the spring is inclined downward upon the rear end of arm $a$, and said rear end, $a$, is inclined upward, whereby the shoulders F and G are thrown out of contact. The upper arm, $a$, being thus relieved from the spring, the tooth and shank are thrown backward, when they pass freely over the obstruction without liability of being broken. As an equivalent for the spring C, a jointed bar, E', provided with a spiral spring, H', and retaining-cap I', may be substituted, as shown in Fig. 2, in which case the joint in the bar permits said bar to be bowed upward, as the shoulder F is disengaged, while the spring H' holds the jointed bar down with a force equivalent in effect to that of the spring-plate shown in Fig. 1, whereby the tooth and shank are retained in their proper positions. The pitch or angle of the tooth is changed to that of the draw-bar by moving the spring E forward or backward, the angle being increased by adjusting said plate forward, and decreased by adjusting it backward. Slots K K are provided in the front end of the spring for the reception of the retaining-bolts L L, which slots permit of the forward and rearward adjustment of said spring, as the pitch of the tooth may require.

Having thus described my invention, what I claim as new, and desire to secure by Letters Patent, is—

In agricultural implements, the shank C, having angular arms $a$ $b$, secured to the draw-bar by the bolt D, said arm $a$ being provided with a shoulder, G, at a distance from its end, in combination with a retaining-plate, E, provided with a retaining-shoulder, L, at a distance from its end, the rear end of said arm $a$ being adapted, as it is thrown upward by contact of the tooth with an obstruction, to bear against said projecting end of the plate E in rear of shoulder F, whereby said shoulders are disengaged and said arm is relieved from said plate, and the tooth of said shank permitted to yield to and pass the obstruction, substantially as and for the purpose set forth.

In testimony whereof I affix my signature in presence of two witnesses.

JOSEPH F. WHEELER.

Witnesses:
JAS. B. ERWIN,
B. W. FETTHOUSEN.